(12) United States Patent
Kuroki et al.

(10) Patent No.: US 11,430,480 B2
(45) Date of Patent: Aug. 30, 2022

(54) DATA STORAGE DEVICE REWINDING TAPE SO AS TO REDUCE TAPE DISTORTION

(71) Applicant: Western Digital Technologies, Inc., San Jose, CA (US)

(72) Inventors: Kenji Kuroki, Kanagawa (JP); Oscar J. Ruiz, San Jose, CA (US); Masahito Kobayashi, Ibaraki (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/181,044

(22) Filed: Feb. 22, 2021

(65) Prior Publication Data

US 2022/0199118 A1 Jun. 23, 2022

Related U.S. Application Data

(60) Provisional application No. 63/128,249, filed on Dec. 21, 2020.

(51) Int. Cl.
*G11B 15/43* (2006.01)
*G11B 15/32* (2006.01)

(52) U.S. Cl.
CPC .............. *G11B 15/43* (2013.01); *G11B 15/32* (2013.01)

(58) Field of Classification Search
None
See application file for complete search history.

(56) References Cited

U.S. PATENT DOCUMENTS

| 5,947,410 | A | 9/1999 | Christie |
| 6,038,092 | A * | 3/2000 | Wojciechowski et al. .................. G11B 27/36 360/31 |
| 6,918,553 | B2 | 7/2005 | Zwettler et al. |
| 8,270,108 | B2 | 9/2012 | Harper et al. |
| 8,446,684 | B2 | 5/2013 | Bui et al. |
| 8,891,197 | B2 | 11/2014 | Hancock et al. |
| 8,982,500 | B1 | 3/2015 | Cherubini et al. |
| 9,153,280 | B2 | 10/2015 | Bui et al. |
| 10,497,391 | B1 | 12/2019 | Miyamura et al. |

OTHER PUBLICATIONS

Oracle, "Protecting Your Archival Data With Improved Tape Dimensional Stability," Jan. 2011, https://www.oracle.com/technetwork/articles/systems-hardware-architecture/tape-dimensional-stability-294733.pdf.
M. A. Lantz, G. Cherubini, A. Pantazi and J. Jelitto, "Servo-Pattern Design and Track-Following Control for Nanometer Head Positioning on Flexible Tape Media," in IEEE Transactions on Control Systems Technology, vol. 20, No. 2, pp. 369-381, Mar. 2012.

* cited by examiner

*Primary Examiner* — Craig A. Renner
(74) *Attorney, Agent, or Firm* — Patterson + Sheridan, LLP; Steven H. VerSteeg

(57) ABSTRACT

A data storage device configured to access a magnetic tape wound around a first reel and a second reel is disclosed, wherein the data storage device comprises at least one head configured to access the magnetic tape. A distortion of the magnetic tape is measured, and the magnetic tape is rewound so that the first and second reels have a respective first and second radius of the wound magnetic tape based on the measured distortion.

26 Claims, 6 Drawing Sheets

DATA STORAGE DEVICE REWINDING TAPE SO AS TO REDUCE TAPE DISTORTION

CROSS REFERENCE TO RELATED APPLICATIONS

This application claims priority to U.S. Provisional Patent Application Ser. No. 63/128,249, filed on Dec. 21, 2020, which is hereby incorporated by reference in its entirety.

BACKGROUND

Conventional tape drive storage systems comprise a magnetic tape wound around a dual reel (reel-to-reel cartridge) or a single reel (endless tape cartridge), wherein the reel(s) are rotated in order to move the magnetic tape over one or more transducer heads during write/read operations. The format of the magnetic tape may be single track or multiple tracks that are defined linearly, diagonally, or arcuate with respect to the longitudinal dimension along the length of the tape. With a linear track format, the heads may remain stationary relative to the longitudinal dimension of the tape, but may be actuated in a lateral dimension across the width of the tape as the tape moves past the heads. With a diagonal or arcuate track format, the heads may be mounted on a rotating drum such that during access operations both the heads and tape are moved relative to one another (typically in opposite directions along the longitudinal dimension of the tape).

DETAILED DESCRIPTION

Figure 1A:
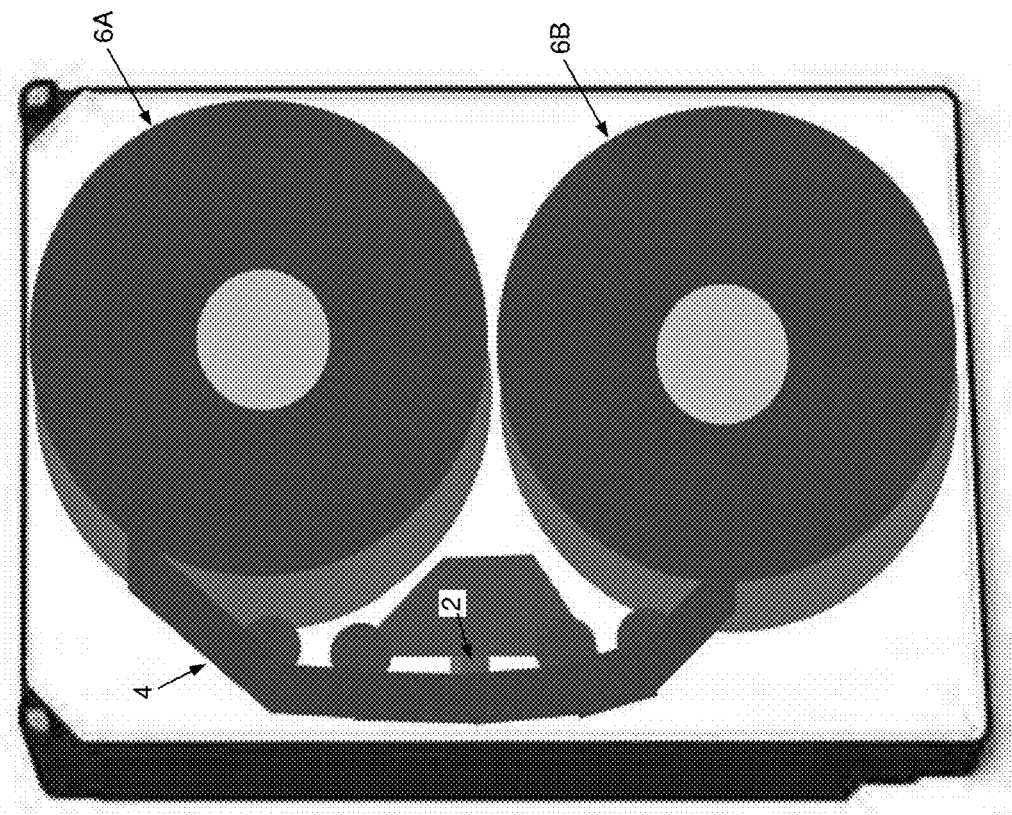
FIG. 1A shows a data storage device according to an embodiment comprising at least one head configured to access a magnetic tape wound around first and second reels.
Figure 1B:
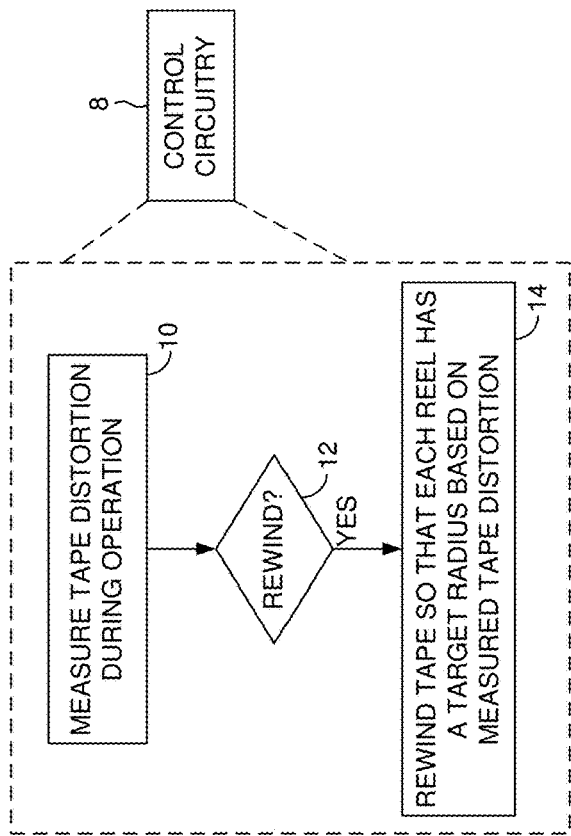
FIG. 1B is a flow diagram according to an embodiment wherein the magnetic tape is rewound so that the first and second reels have a respective first and second radius of the wound magnetic tape based on a measured distortion of the magnetic tape.
Figure 1C:
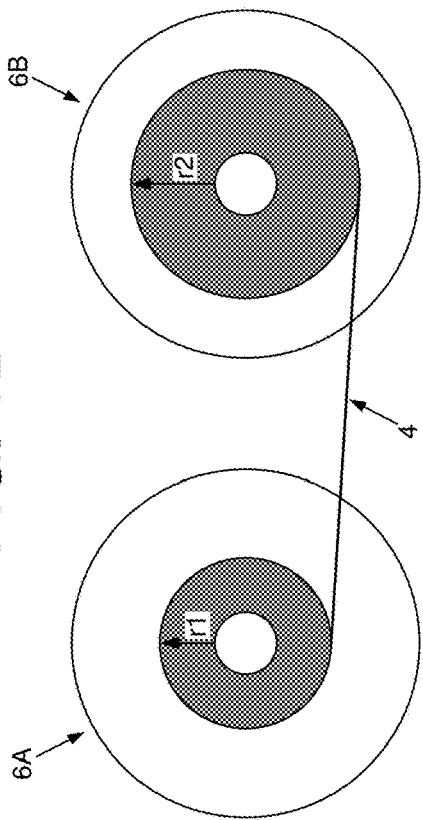
FIG. 1C shows the first and second reels having respective first and second radius of the wound magnetic tape after rewinding the magnetic tape according to an embodiment.

FIGS. 1A-1C show a data storage device according to an embodiment comprising at least one head 2 configured to access a magnetic tape 4 wound around a first reel 6A and a second reel 6B, and control circuitry 8 configured to execute the flow diagrams disclosed herein in order to rewind the magnetic tape in a manner that reduces a distortion of the magnetic tape. For example, FIG. 1B shows a flow diagram according to an embodiment wherein a distortion of the magnetic tape is measured (block 10), and when rewinding the magnetic tape (block 12), the magnetic tape is rewound so that the first and second reels have a respective first radius r1 and second radius r2 of the wound magnetic tape (e.g., FIG. 1C) based on the measured distortion (block 14).

Figure 1D:
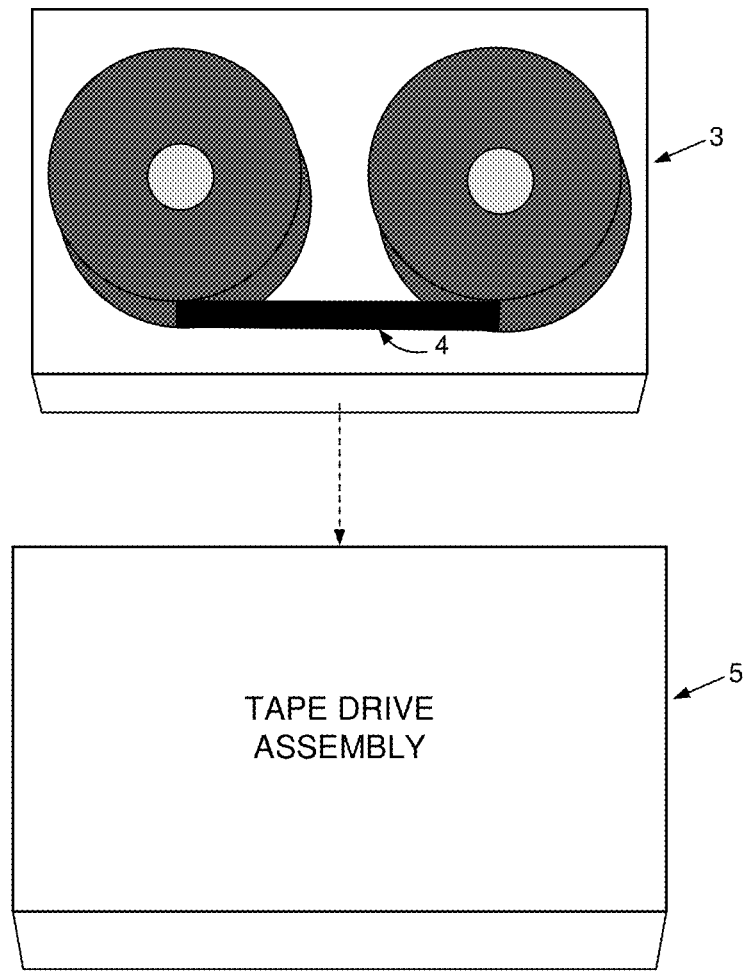
FIG. 1D shows an embodiment wherein the data storage device comprises a tape drive assembly configured to access a magnetic tape housed in a cartridge assembly.

In the embodiment of FIG. 1A, the data storage device comprises an embedded magnetic tape 4 installed into a tape drive assembly which, in one embodiment, may be the same form factor as a conventional disk drive. In another embodiment shown in FIG. 1D, the magnetic tape 4 may be housed in a cartridge assembly 3 that is inserted into (and ejected from) a tape drive assembly 5 similar to a conventional tape drive manufactured under the Linear Tape-Open (LTO) standard. In one embodiment, the tape drive assembly 5 comprises the head 2 configured to access the magnetic tape 4, and the control circuitry configured to execute the flow diagram of FIG. 1B.

Figure 2A:
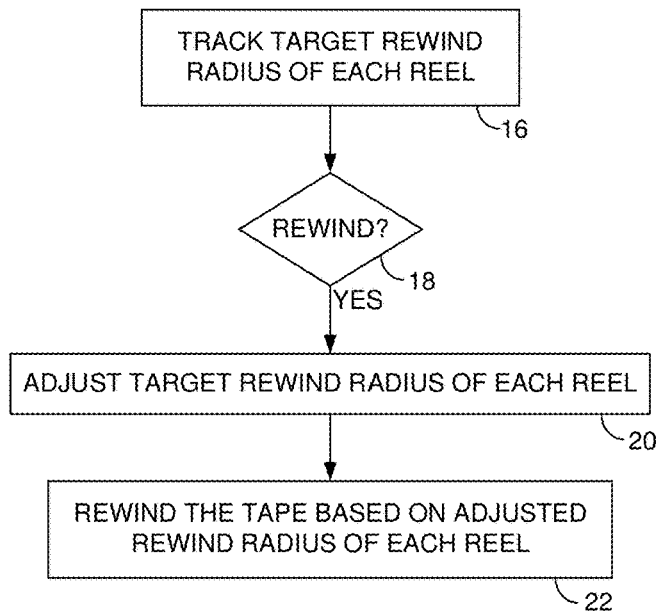
FIG. 2A is a flow diagram according to an embodiment wherein a first and second target radius is adjusted over time, and the magnetic tape is rewound so that the first and second reels have the adjusted first and second target radius of the wound magnetic tape.
Figure 2B:
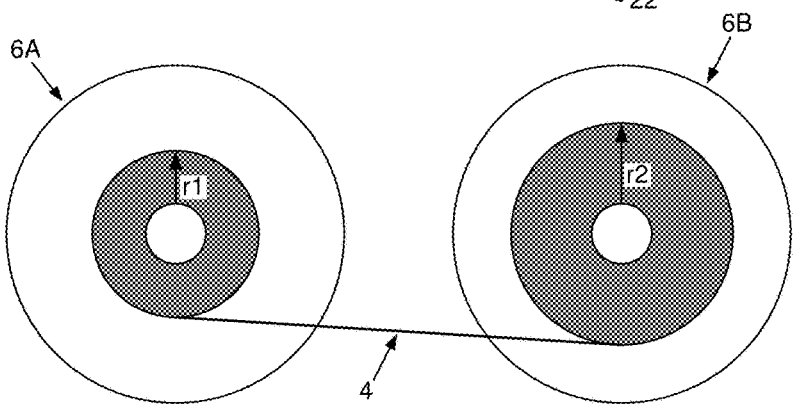
FIGS. 2B-2D show an embodiment wherein the target radius of each reel is adjusted over time in order to spread a distortion over a length of the magnetic tape.
Figure 2C:
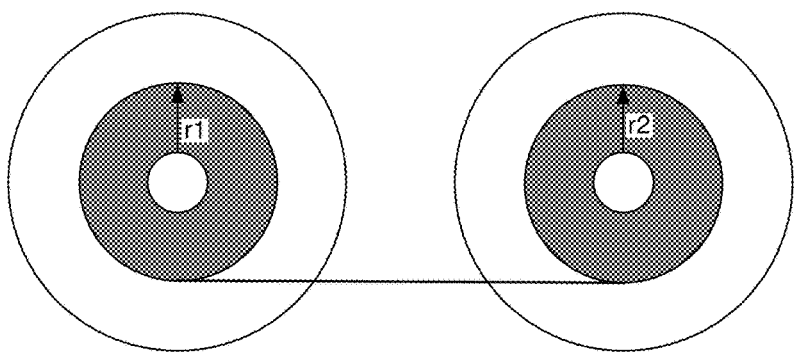
Figure 2D:
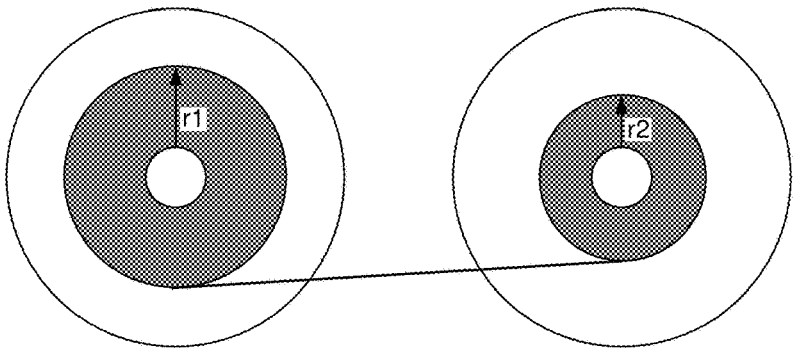

FIG. 2A is a flow diagram according to an embodiment wherein the control circuitry maintains a first target radius of the first reel and a second target radius of the second reel (block 16). Prior to rewinding the magnetic tape (block 18), the first and second target radius are adjusted (block 20), and the magnetic tape is rewound so that the first and second reels have the adjusted first and second target radius of the wound magnetic tape (block 22). FIGS. 2B-2D show examples of the magnetic tape being rewound onto the first and second reels based on the adjusted target radius of each reel, wherein in one embodiment the target radius of each reel may range from a minimum radius when none of the magnetic tape remains on a reel to a maximum radius when all of the magnetic tape remains on a reel after the rewind operation. In one embodiment, the target radius of each reel may be adjusted prior to every rewind operation, and in another embodiment, the target radius of each reel may be adjusted for every Nth rewind operation, based on a randomized sequence of rewind operations, etc. In one embodiment, the target radius of each reel such as shown in FIG. 2B-2D may be adjusted in combination with other embodiments disclosed herein, such as rewinding the magnetic tape based on a measured distortion of the magnetic tape as described above.

Figure 3A:
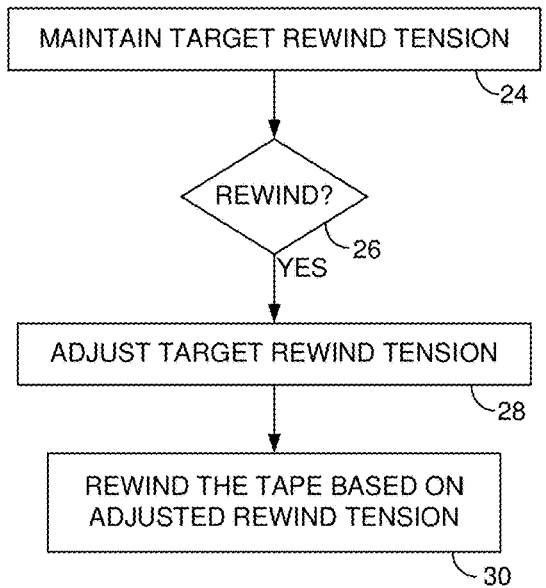
FIG. 3A is a flow diagram according to an embodiment wherein a target rewind tension of the magnetic tape is adjusted over time and the magnetic tape is rewound based on the adjusted target tension.
Figure 3B:
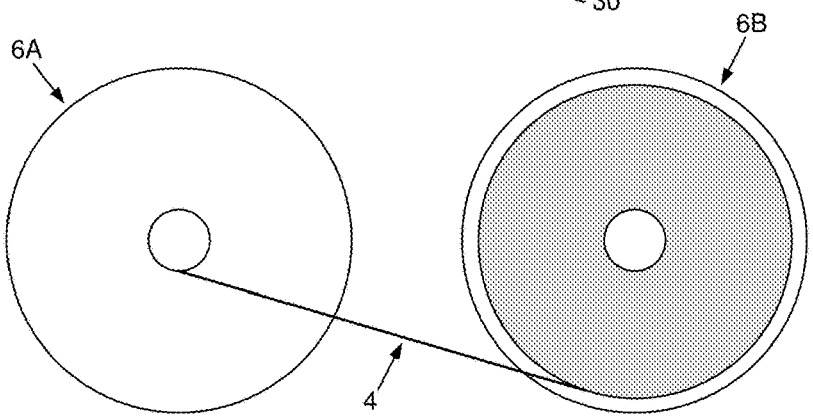
FIGS. 3B-3D show an embodiment wherein the magnetic tape is rewound based on different target tensions.
Figure 3C:
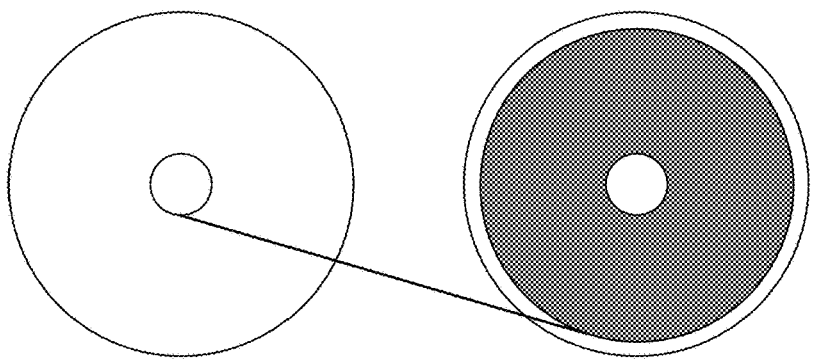
Figure 3D:
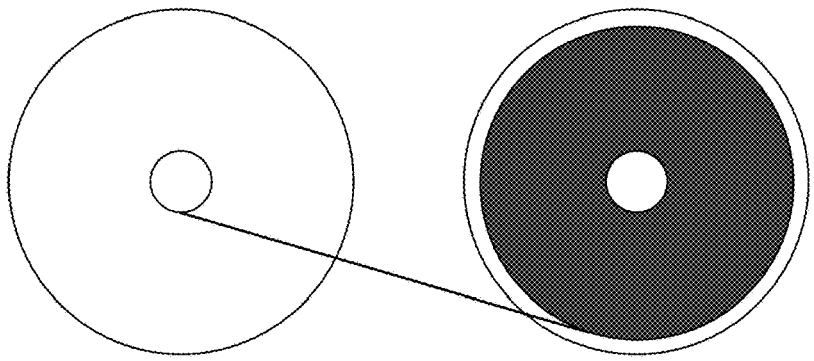

FIG. 3A is a flow diagram according to an embodiment wherein the control circuitry maintains a target rewind tension for the magnetic tape (block 24). Prior to rewinding the magnetic tape (block 26), the target rewind tension is adjusted (block 28), and the magnetic tape is rewound based on the adjusted target rewind tension (block 30). FIGS. 3B-3D show examples of the magnetic tape being rewound based on different rewind tensions, wherein the lighter shade of the magnetic tape represents a lower rewind tension and a darker shade represents a higher rewind tension. In one embodiment, the target rewind tension may be adjusted prior to every rewind operation, and in another embodiment, the target rewind tension may be adjusted for every Nth rewind operation, based on a randomized sequence of rewind operations, etc. In one embodiment, the rewind tension may be adjusted in combination with other embodiments disclosed herein, such as adjusting the rewind tension based on a measured distortion of the magnetic tape, or rewinding the magnetic tape based on the target rewind tension and based on a target radius of each real as described above. In the example embodiment shown in FIGS. 3B-3D, the magnetic tape is rewound completely onto one of the magnetic reels based on the target rewind tension, whereas in other embodiments the magnetic tape may be rewound so that each reel has a target radius of magnetic tape as described above.

Figure 4A:
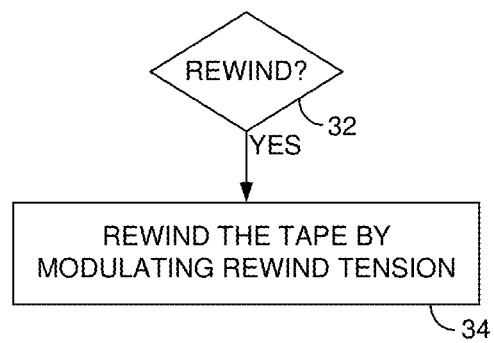
FIG. 4A shows an embodiment wherein the magnetic tape is rewound by modulating the rewind tension during the rewind operation.
Figure 4B:
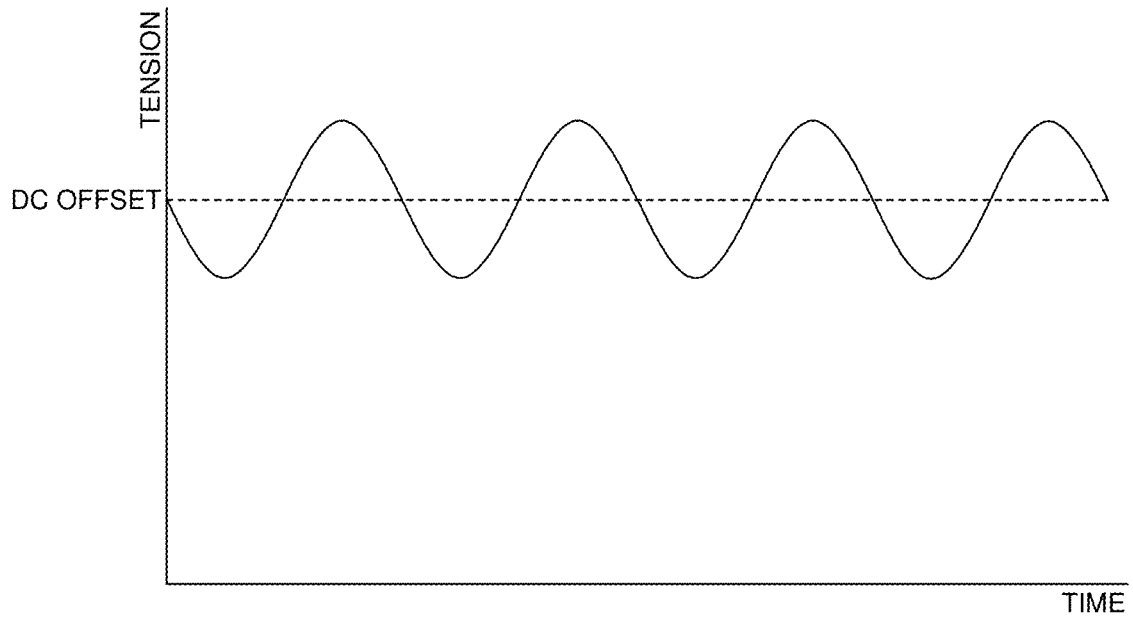
FIG. 4B shows an embodiment wherein the rewind tension is modulated based on a DC offset representing an average rewind tension and an AC value (e.g., sinusoidal modulation).
Figure 4C:
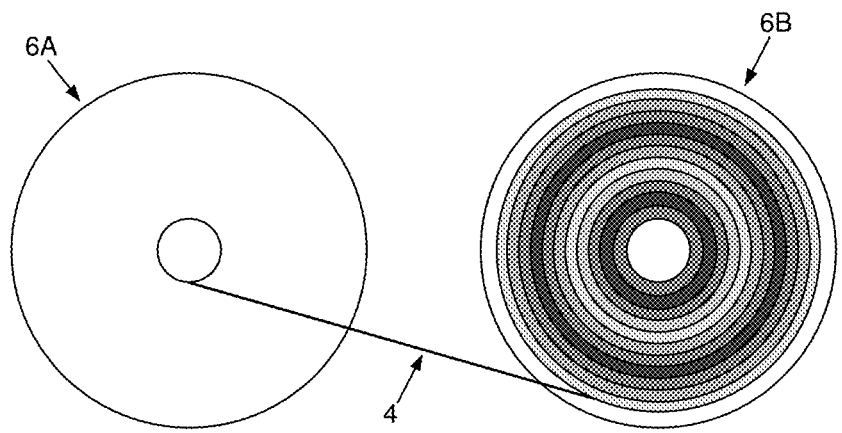
FIG. 4C shows an embodiment wherein modulating the rewind tension during the rewind operation results in a modulated tape pack stress on the magnetic tape.

FIG. 4A is a flow diagram according to an embodiment wherein during a rewind operation (block 32), the magnetic tape is rewound by modulating the rewind tension while rewinding the magnetic tape (block 34). In one embodiment, the rewind tension is modulated while rewinding the magnetic tape by adding an AC value to a DC offset representing an average rewind tension. FIG. 4B shows an example of this embodiment wherein the rewind tension is modulated by adding a sinusoidal AC value to a DC offset, wherein the sinusoidal AC values may be generated with any suitable amplitude, frequency, and phase. In other embodiments, the AC value may be generated based on any other suitable function, such as a triangle or sawtooth waveform. FIG. 4C shows an example of the rewind tension being modulated while rewinding the magnetic tape based on the sinusoidal AC values shown in FIG. 4B, wherein the varying shades of gray across the radius of the magnetic tape represents the modulated rewind tension.

Figure 5:
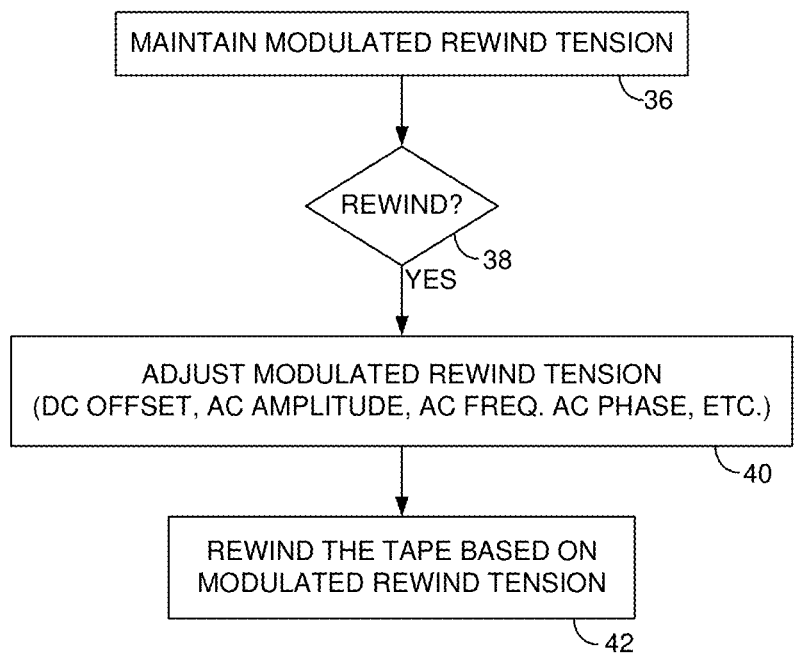
FIG. 5 is a flow diagram according to an embodiment wherein the modulation of the rewind tension is adjusted by adjusting at least one of the DC offset, the AC amplitude, the AC frequency, or the AC phase.

FIG. 5 is a flow diagram according to an embodiment wherein the control circuitry maintains a modulated rewind tension of the magnetic tape (block 36), such as by maintaining a current DC offset and/or function for generating the AC values. Prior to rewinding the magnetic tape (block 38), at least one of the DC offset or the AC value is adjusted (e.g., by adjusting the amplitude, frequency, or phase of AC values) (block 40), and the magnetic tape is rewound by modulating the rewind tension based on the adjusted modulated tension (block 42). In one embodiment, the modulation of the rewind tension is changed across different rewind operations, but the adjusted modulation remains constant while rewinding the magnetic tape. In another embodiment, the modulation of the rewind tension may by adjusted while rewinding the magnetic tape, such as by adjusting the DC offset or the function for generating the AC values while rewinding the magnetic tape.

In one embodiment, the target radius of the magnetic tape for each reel as described above may be adjusted based on a modulation function similar to the function shown in FIG. 4B. That is, the target radius of each reel may vary across different rewind operations such that each radius changes based on any suitable AC function (sinusoidal, triangle, sawtooth, etc.).

In one embodiment in order to adjust the rewind tension across different rewind operations or during a rewind operation, the magnetic tape may first be rewound completely onto a first reel (e.g., reel 6A), and then rewound completely onto a second reel (e.g., reel 6B). The rewind tension may then be configured to the target or modulated rewind tension while rewinding the magnetic tape completely back onto the first reel (e.g., reel 6A). In the embodiment wherein each reel has a target radius of magnetic tape, the magnetic tape may be partially rewound back onto the second reel (e.g., reel 6B). In this manner, the magnet tape may be stored with a target radius for each reel and/or a target or modulated tension across the tape pack.

In one embodiment, adjusting the radius of each reel and/or adjusting the rewind tension as described above causes a distortion of the magnetic tape to be spread over a length of the magnetic tape. That is, in one embodiment adjusting the radius of each reel and/or adjusting the rewind tension across different rewind operations (or during rewind operations) may better randomize the tape pack stress across the length of the magnetic tape as compared to rewinding the magnetic tape based on a fixed radius and/or a fixed rewind tension.

Figure 6:
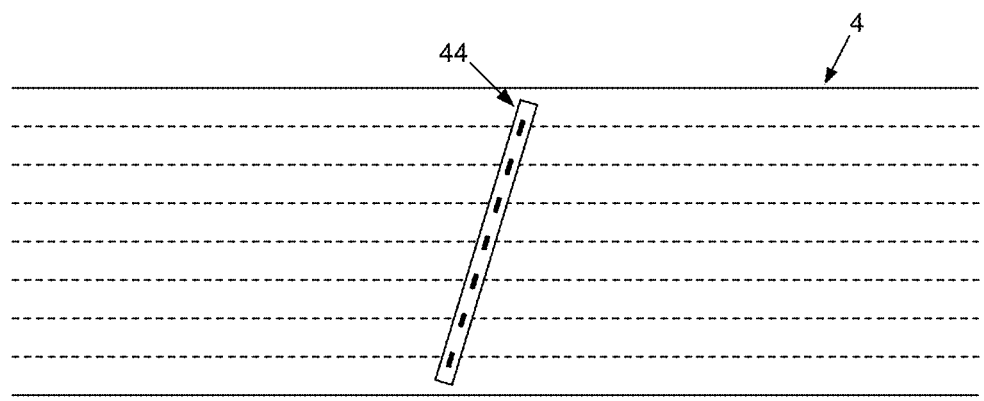
FIG. 6 shows an embodiment wherein a distortion of the magnetic tape is measured based on the tilt angle of a head bar that is tilted to compensate for the distortion.

In the embodiments wherein a distortion of the magnetic tape is measured in order to adjust the radius of each reel and/or to adjust the target or modulated rewind tension, any suitable technique may be employed to measure the distortion. In one embodiment shown in FIG. 6, a head bar 44 comprises a plurality of heads configured to access a plurality of data tracks. In one embodiment, an angle of the head bar 44 is adjusted (i.e., the head bar 44 may be tilted) in order to compensate for an expansion or contraction of the magnetic tape and corresponding expansion or contraction of the data tracks. Accordingly in one embodiment, the varying tilt angle while servoing the head bar 44 may represent the measured distortion along the length of the magnetic tape.

In one embodiment, a distortion map may be maintained representing the degree of distortion along predetermined segments of the magnetic tape. In this embodiment, the radius of each reel and/or the target or modulated rewind tension may be configured based on the distortion map. For example, in one embodiment the rewind tension may be decreased while rewinding the magnetic tape when reaching a predetermined segment having a contraction distortion, or conversely the rewind tension may be increased while rewinding the magnetic tape when reaching a predetermined segment having an expansion distortion.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In addition, any suitable electronic device, such as computing devices, data server devices, media content storage devices, etc. may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device configured to access a magnetic tape wound around a first reel and a second reel, the data storage device comprising:
   at least one head configured to access the magnetic tape; and
   control circuitry configured to:
      measure a distortion of the magnetic tape;
      modulate a target rewind tension based on an oscillating waveform; and
      rewind the magnetic tape so that the first and second reels have a respective first radius and second radius of the wound magnetic tape based on the distortion.

2. The data storage device as recited in claim 1, wherein after rewinding the magnetic tape:
   the first radius ranges from a minimum radius when none of the magnetic tape remains on the first reel to a maximum radius when all of the magnetic tape remains on the first reel; and
   the second radius ranges from a minimum radius when none of the magnetic tape remains on the second reel to a maximum radius when all of the magnetic tape remains on the second reel.

3. The data storage device as recited in claim 1, wherein the control circuitry is further configured to:

maintain the target rewind tension;
   prior to rewinding the magnetic tape, adjust the target rewind tension based on the modulated target rewind tension; and
   rewind the magnetic tape based on the adjusted target rewind tension.

4. The data storage device as recited in claim 3, wherein the target rewind tension during a first rewind is different than the target rewind tension during a second rewind.

5. The data storage device as recited in claim 1, wherein the target rewind tension is modulated across a plurality of rewind operations.

6. The data storage device as recited in claim 1, wherein the target rewind tension is modulated by adding an AC value to a DC offset representing an average rewind tension.

7. The data storage device as recited in claim 6, wherein the control circuitry is further configured to generate the AC value based on the oscillating waveform, and the oscillating waveform is a sinusoidal function.

8. The data storage device as recited in claim 1, wherein the control circuitry is further configured to modulate a first rewind tension of the magnetic tape based on the target rewind tension while rewinding the magnetic tape.

9. The data storage device as recited in claim 1, wherein the control circuitry is further configured to:
   maintain a first target radius of the first reel and a second target radius of the second reel;
   prior to rewinding the magnetic tape, adjust the first target radius and the second target radius; and
   rewind the magnetic tape so that the first and second reels have the adjusted first target radius and second target radius of the wound magnetic tape.

10. The data storage device as recited in claim 9, wherein the first target radius and the second target radius are adjusted based on the distortion.

11. The data storage device as recited in claim 9, wherein the first target radius and the second target radius are adjusted over time in order to spread the distortion of the magnetic tape over a length of the magnetic tape.

12. The data storage device as recited in claim 8, wherein the first rewind tension is modulated by adding an AC value to a DC offset representing an average rewind tension.

13. The data storage device as recited in claim 12, wherein the control circuitry is further configured to generate the AC value based on the oscillating waveform, and the oscillating waveform is a sinusoidal function.

14. The data storage device as recited in claim 13, wherein the control circuitry is further configured to adjust at least one of the DC offset or the AC value across different rewind operations.

15. The data storage device as recited in claim 14, wherein the control circuitry is configured to adjust the AC value by adjusting at least one of an amplitude of the AC value, a frequency of the AC value, or a phase of the AC value.

16. The data storage device as recited in claim 12, wherein the control circuitry is further configured to adjust at least one of the DC offset or the AC value while rewinding the magnetic tape.

17. The data storage device as recited in claim 16, wherein the control circuitry is configured to adjust the AC value by adjusting at least one of an amplitude of the AC value, a frequency of the AC value, or a phase of the AC value.

18. The data storage device as recited in claim 1, wherein the control circuitry is further configured to:
   maintain a distortion map of the magnetic tape representing a degree of distortion along predetermined segments of the magnetic tape; and rewind the magnetic tape based on the distortion map.

19. The data storage device as recited in claim 1, wherein the target rewind tension is modulated while rewinding the magnetic tape.

20. The data storage device as recited in claim 1, wherein the oscillating waveform includes one or more of an amplitude, a frequency, or a phase.

21. The data storage device as recited in claim 1, wherein the oscillating waveform is a sinusoidal function, a triangular function, or a sawtooth function.

22. The data storage device as recited in claim 1, wherein the measuring of the distortion comprises determining a varying title angle of a head bar that comprises the at least one head.

23. A data storage device configured to access a magnetic tape wound around a first reel and a second reel, the data storage device comprising:
    at least one head configured to access the magnetic tape; and
    control circuitry configured to:
        measure a distortion of the magnetic tape;
        modulate a target rewind tension by adding an AC value to a DC offset representing an average rewind tension; and
        rewind the magnetic tape so that the first and second reels have a respective first radius and second radius of the wound magnetic tape based on the distortion.

24. The data storage device as recited in claim 23, wherein the control circuitry is further configured to generate the AC value based on a sinusoidal function.

25. A data storage device configured to access a magnetic tape wound around a first reel and a second reel, the data storage device comprising:
    at least one head configured to access the magnetic tape; and
    control circuitry configured to:
        maintain a target rewind tension;
        measure a distortion of the magnetic tape;
        modulate the target rewind tension across a plurality of rewind operations by adding an AC value to a DC offset representing an average rewind tension;
        adjust the target rewind tension; and
        after the adjusting of the target rewind tension, rewind the magnetic tape based on the adjusted target rewind tension so that the first and second reels have a respective first radius and second radius of the wound magnetic tape based on the distortion,
        wherein the target rewind tension during a first rewind is different than the target rewind tension during a second rewind.

26. The data storage device as recited in claim 25, wherein the control circuitry is further configured to generate the AC value based on a sinusoidal function.

* * * * *